3,029,302
PROCESS FOR REDUCING THE ELECTRICAL RESISTIVITY OF THE SOIL, PARTICULARLY FOR EARTH CONNECTIONS
Charles Pierre Ledoux, 18 Rue Achille Jubinal, Tarbes, Hautes-Pyrenees, France
No Drawing. Filed Nov. 6, 1958, Ser. No. 772,153
Claims priority, application France Nov. 9, 1957
7 Claims. (Cl. 174—6)

Numerous earth connections are used in installations of all kinds, particularly in electrical installations, for operational or safety reasons.

These earth connections consist of metal conductors buried in the ground and in good contact with the latter. The resistance of the earth connection is a function, on the one hand of the shape, of the dimensions and of the position of the electrodes and, on the other hand of the resistivity of the ground.

The use of electrodes having sufficiently large dimensions renders it possible to obtain a resistance which does not exceed the maximum permissible value for the application in question, but too often the said dimensions lead to a prohibitive cost which is out of proportion to the result for the application in question.

In numerous cases, therefore, it is necessary to act on the resistivity of the ground; for this purpose, it is the present practice to impregnate the soil with electrolytes such as sodium chloride of which the solution in water retained by the soil considerably reduces the resistivity of the latter.

This process has the disadvantage that the sodium chloride is not retained by the absorbent power of the soil and is entrained by seepage water, rendering frequent repetition of the treatment necessary; at the same time, the presence of this salt increases the corrosion phenomena in the metals and concrete, and finally its noxious action on vegetation prevents its use on cultivated land.

The object of the present invention is to reduce the resistivity of the soil by the use of an electrolyte, but an electrolyte which is characterised by the use of a salt which is only slightly soluble in water but is nevertheless an adequate conductor; the advantage of a low solubility in water is that the salt is no longer entrained by seepage water; the high conductivity, even in a very dilute solution, is necessary to reduce the resistivity of the soil to a considerable extent.

Of the salts having the above characteristics, it is advisable to select for preference salts which do not cause corrosion phenomena and, of course, which are cheap enough for extensive use.

The present invention relates in particular to the use of calcium sulphate $CaSO_4$ irrespective of whether it is used in its natural form of gypsum or anhydrite or in the partially dehydrated form of plaster; actually, the solubility of gypsum in water is less than 2 parts per thousand at 10° C. The saturated solution has a resistivity of the order of 4 to 8Ω per m./m.² depending on the temperature. Such a solution, impregnating ground having a high resistivity, can reduce it to one tenth to one twentieth of its value. If the resistivity of the ground is low, it may be reduced to one fifth to one tenth of its value.

It is known that an earth connection of any shape, but reasonably compact is comparable to a hemispherical earth connection having a radius $r$ and that, if the resistivity of the ground is reduced to a value $n$ times lower in a volume of radius $mr$, the resistance of the earth connection is theoretically divided by the factor $$\frac{mn}{m+n-1}$$

In temperate climates, the average precipitation of water on the ground is of the order of 60 cm. per year; less than half this water, about 260 litres per m.², penetrates into the ground and can, at the most, entrain 0.4 kg. of calcium sulphate per m.², so that by spreading the calcium sulphate at the rate of 4 to 8 kg. per m.², the treatment will remain effective for a period of 10 to 20 years.

Calcium phosphates may also be used according to the present invention, but their effectiveness is lower and their cost higher; other substances may also be used provided that they have properties of solubility and conductivity similar to those of calcium sulphate.

The process according to the present invention may be supplemented or improved by a certain number of other processes, this combined use naturally coming within the scope of the present invention.

By way of example, the use of the processes may be influenced by substances which increase the solubility of calcium sulphate, for example such substances as sulphuric and phosphoric acids, alkaline chlorides and nitrates, such substances likewise exerting an effect on the increase in conductivity. Conversely, it may be desired to use substances which exert a retarding action by reducing the solubility of the calcium sulphate, for example substances such as certain calcium salts and certain alkaline sulphates.

In the case of chalky soils, or in cases where gypsum or plaster are used containing a certain proportion of lime or carbonate of lime, it is possible to convert said lime or said carbonate of lime into a sulphate by adding sulphur which oxidizes slowly in the soil to produce successively hyposulphites, polythionates and finally calcium sulphate; in addition, sulphur releases the potassium from the alkaline silicates in the soil, producing potassium sulphate which is absorbed by the soil, the conductivity of which it increases.

Since potassium salts are retained in a certain proportion by the clay and humus complex, it is sometimes an advantage, in clay soils, to add to the calcium sulphate used a certain proportion of a potassium salt (chloride, sulphate, etc.) which increases with conductivity and contributes slightly to an increase in the retention of water by the soil.

Still with a view to supplementing the action of the calcium sulphate, it may be an advantage to modify the pH of the soil with a view to facilitating the release of salts which improve the conductivity: in an acid soil such as marshy, peaty, siliceous soils etc., a substance may be added to the calcium sulphate to provide lime (limestone, tricalcium phosphate etc.) and in a basic soil such as chalky soils, a substance providing an acid element (sulphur, chlorides, etc.) may be added to the calcium sulphate.

It is known that calcium sulphate is not retained by the adsorbent power of the soil and that it has little effect on its power of retaining water. It is therefore possible to improve the effect of the calcium sulphate by adding clay, the particles of which reduce the porosity of the soil and particularly of sand, and increase the water-retaining power; it is also possible to add to the calcium sulphate organic substances, preferably those which decompose slowly, which, by increasing the relative importance of the clay and humus complex, increase the retention of the absorbed water; moreover, the decomposition of these organic substances releases ammonia which nitrifies and increases the conductivity of the soil.

It is also possible to combine the use of the process according to the invention by the simultaneous use, in the immediate vicinity of the earth electrodes, of a process of filling in the interstices in the soil with a view to reducing considerably the contact resistance between the electrodes and the soil; of the known processes, it is possible to use the process forming the subject of the French Patent No. 985,736 of May 6, 1949; the simultaneous use of the two processes enables the best results to be obtained.

The carrying out of the process forming the subject of the present invention is extremely easy because it is sufficient to spread on the soil the calcium sulphate (or other similar substance) with or without the addition of one or more accessory substances, the purpose of which has been defined (or any other substances serving a similar purpose). It is also possible to incorporate it in the surface layer of soil by hoeing or ploughing. It is also possible to place it at the bottom of small trenches distributed over the whole surface to be treated and later filled in. It is then sufficient to water it, or simply to wait for the rain to dissolve it and entrain it into the depths of the soil.

One important advantage of the present invention is the fact that the substances used are not corrosive and do not harm the vegetation on which, on the contrary, they have a favourable action. They may therefore be used in all cases, particularly on cultivated land. Since these low-solubility substances are not expensive, they may be used in sufficiently large amounts for their action to be felt for many years, and the application may easily be repeated after exhaustion.

I claim:

1. A process for reducing the electrical resistance of soils around a grounding electrode which comprises applying to the soil separate from the grounding electrode a composition consisting essentially of calcium sulphate, said applying step including placing said composition in an area of selectable size surrounding the position in the soil of the grounding electrode and in such an amount that the resistance of the soil will be reduced to the desired value by water in the soil causing the formation of an electrolyte from said calcium sulphate so that said resistance will remain at a relatively low level for a time period of several years.

2. A process according to claim 1 wherein the calcium sulphate is supplied as a chemical selected from the group consisting of gypsum, anhydrous calcium sulphate and partially dehydrated calcium sulphate.

3. A process according to claim 1 wherein the calcium sulphate is applied at a rate of 4 to 8 kilograms per square meter of soil treated.

4. A process according to claim 1 including the step of adding sulphur to the soil with the calcium sulphate.

5. A process according to claim 1 including the step of adding to the soil with the calcium sulphate a compound selected from the group consisting of potassium chloride and potassium sulphate.

6. A process according to claim 1 including the step of adding lime to the soil with the calcium sulphate.

7. A process according to claim 1 including the step of adding clay to the soil with the calcium sulphate.

References Cited in the file of this patent

UNITED STATES PATENTS

| | | |
|---|---|---|
| 938,471 | Garton | Nov. 2, 1909 |
| 1,244,118 | Mullen | Oct. 23, 1917 |
| 1,681,644 | Maple | Aug. 21, 1928 |
| 1,737,562 | Borden | Dec. 3, 1929 |
| 1,856,506 | Preston | May 3, 1932 |
| 2,558,159 | Sanick | June 26, 1951 |

FOREIGN PATENTS

| | | |
|---|---|---|
| 256,802 | Great Britain | Aug. 19, 1926 |
| 399,388 | Great Britain | Oct. 5, 1933 |
| 400,739 | Great Britain | Nov. 2, 1933 |

OTHER REFERENCES

Collins: Commercial Fertilizers, 5th ed., 1955, pub. McGraw-Hill, New York, pages 139–141, 205, 294–319 relied on.